United States Patent

[11] 3,538,965

| [72] | Inventors | Jack W. Ehlen<br>Torrance, California, and<br>Joseph B. Stretton, Riverside, Connecticut |
|---|---|---|
| [21] | Appl. No. | 715,011 |
| [22] | Filed | March 21, 1968<br>Continuation-in-part of Ser. No.<br>628,898, April 6, 1967, abandoned |
| [45] | Patented | Nov. 10, 1970 |
| [73] | Assignee | McCulloch Corporation<br>Los Angeles, California<br>a corporation of Wisconsin |

[54] RIVETLESS SAW CHAIN
6 Claims, 10 Drawing Figs.

[52] U.S. Cl. .................................................. 143/135
[51] Int. Cl. ..................................................... B27b 33/14
[50] Field of Search ........................................ 143/135+;
74/248, 250

[56] References Cited

UNITED STATES PATENTS

| 893,607 | 7/1908 | Clouser ....................... | 74/248 |
| 2,826,226 | 3/1958 | Donley ........................ | 143/135 |

FOREIGN PATENTS

| 152,505 | 11/1955 | Sweden ....................... | 143/135 |

Primary Examiner—Donald R. Schran
Attorney—Burns, Doane, Benedict, Swecker and Mathis ABSTRACT: A saw chain formed of single links in which the forward end of each link is connected to the preceding link by a loop extending into an opening in the rear end of the preceding link. Each of the links has means for engaging a driving sprocket and to be supported on a guide bar of a chain saw. The cutters are arranged to extend outwardly from selected links in the direction opposite from the means for engaging the sprocket.

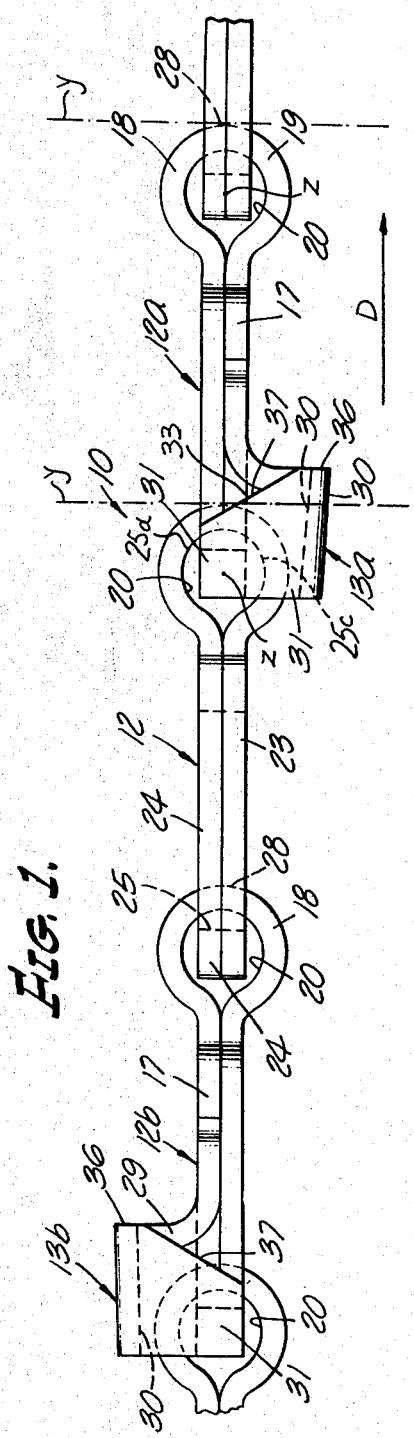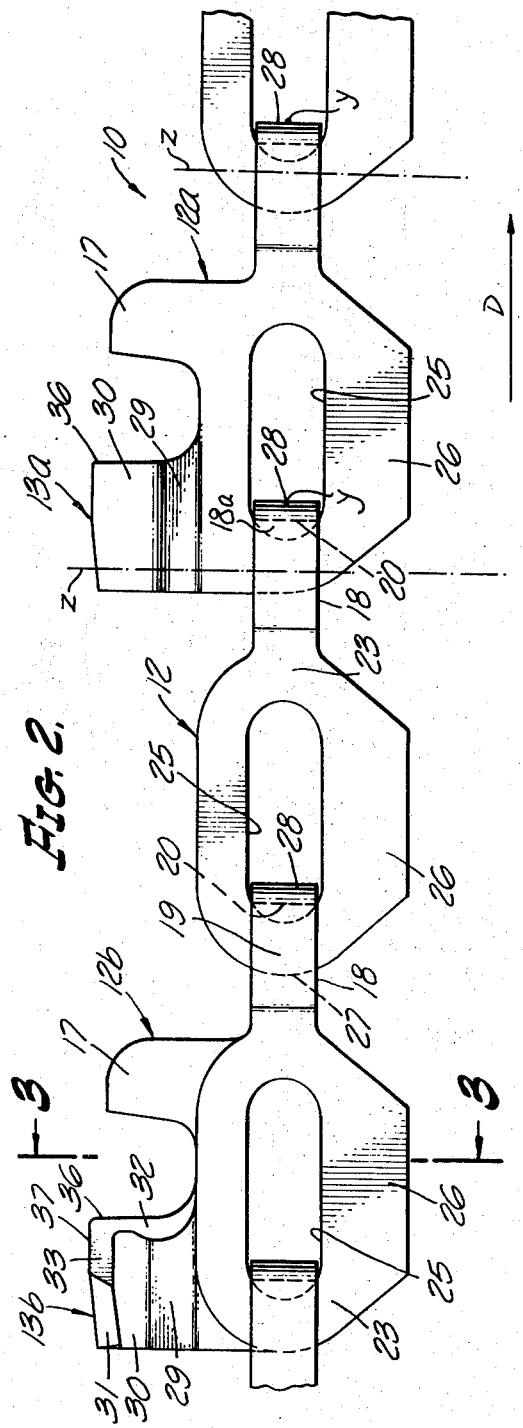

INVENTORS.
JACK W. EHLEN
JOSEPH B. STRETTON
ATTORNEYS

Patented Nov. 10, 1970

INVENTORS
JACK W. EHLEN
JOSEPH B. STRETTON

BY Burns, Doane, Benedict, Swecker & Mathis

ATTORNEYS

RIVETLESS SAW CHAIN

RELATED APPLICATIONS

This application is a continuation-in-part of our prior U.S. Pat. application Ser. No. 628,898, filed April 6, 1967, now abandoned.

BACKGROUND OF THE INVENTION

This invention relates to a saw chain fabricated from interlooped sheet metal links.

The invention pertains to the cutting art and more particularly, to the woodcutting art in which the wood is cut by cutters on a power driven chain.

Prior art saw chains have been generally comprised of alternate center and side links in which each center link is followed by a pair of side links, the connection being made by hinge means. An example of a prior art chain may be seen in U.S. Pat. No. 2,508,784 to Cox. In general, the prior art chains have been relatively expensive and it has been necessary to sharpen the cutters each time that they are dulled until a substantial portion of the cutters has been worn or sharpened away. The present chain is made relatively inexpensively so that, should the operator choose to do so, it can be replaced when the cutters are dull, the requirement for multiple sharpenings having been eliminated by the low cost. The present chain can be sharpened a number of times but economically, need not be sharpened if it is more expeditious to replace it in the field.

Another example of prior art approaches is reflected in a French Pat. No. 396,209 (M. de Redon de Colombier). In one embodiment, Colombier proposes a structure comprising interconnected elipsoid loops. However, this awkward structure obviously poses fabrication problems and is totally devoid of the precision cutting control required in modern-day chain saws.

OBJECTS OF THE INVENTION

The present invention is provided as a time saving saw chain in that it eliminates the need for sharpening in the field or elsewhere which is required in the more expensive prior art chains.

It is an object of the invention to provide a saw chain in which the chain structure is of extreme simplicity and of low cost. This is made possible by the use of single-consecutive links and the elimination of rivet type connections.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

FIG. 1 is a plan view of the saw chain according to the invention, illustrating a sequence of cutters;

FIG. 2 is a side elevational view of the saw chain shown in FIG. 1;

DESCRIPTION OF THE PREFERRED EMBODIMENTS

Figure 3:
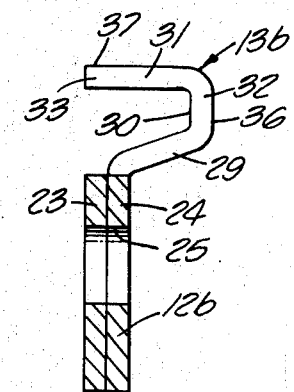
FIG. 3 is a partially cross-sectional view, taken as indicated by the line 3-3 in FIG. 2.
Figure 4:
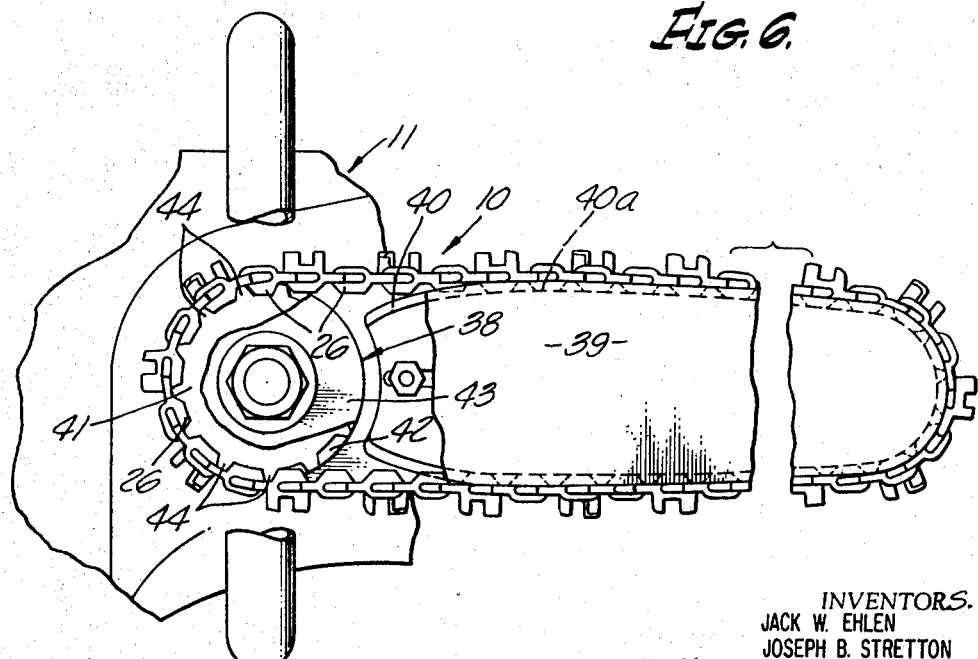
FIG. 4 is a fragmentary view of a chain saw illustrating the present saw chain on a driving sprocket.

Referring again to the drawings, there is shown in FIGS. 1, 2 and 3, a saw chain, generally designated as 10, adapted for use on a chain saw 11, as shown in FIG. 4. The chain is comprised of a succession of consecutive single links, generally designated as 12, among which are selected links as 12a and 12b having right and left-hand side cutters, as 13a and 13b, respectively, and depth gauges 17.

Each link is formed of two vertical adjacent parallel plates 23 and 24, forming a main body portion, connected by a forwardly projected loop 18 having a vertically directed wall 19 and a vertically directed opening 20 therein. The link main body portion 23 and 24 has a longitudinally directed horizontal opening 25 therethrough. At the lower end of the main body portion is a vertically downwardly directed tang 26 adapted to be guided by the groove in the chain saw bar and for driving engagement with a chain saw sprocket, as shown in FIG. 4.

Each body portion of each link has a rear end 27, directly to the rear of the opening 25, which is fitted to extend into the opening 20 in the loop of the next link so as to hold the chain together. Thus, a forward portion 28 of the loop wall extends into the opening 25 of the next forward link.

As may be best seen in FIGS. 1, 2 and 3, the cutters 13 are allochrially arranged on opposite sides of the chain and extend generally vertically upwardly from one of the plates, as 23 or 24, forming the main body of the link. Specifically, extending from the plate, as 24, at its upper end is an intermediate portion 29 extending laterally and upwardly outwardly. A shank portion 30 extends vertically upwardly from the intermediate portion and a toe portion 31 extends horizontally and inwardly from the toe and over the link so as to be spaced upwardly therefrom.

As best seen in FIG. 2, on the cutter 13b, each shank and toe has an inwardly and downwardly directed beveled face 32 and 33, respectively. The beveled faces may be formed by a file or a grinder to form or to sharpen the outer edges 36 and 37 of the shank and toe, respectively, thus forming the toe and shank cutting edges as one continuous cutting edge. The shank and toe both trail inwardly with respect to the link to provide cutting clearances. The depth gauges 17 are spaced forwardly from the cutters and extend outwardly from a plate, as 23 or 24, on the same side of the link as the cutter. The height of the depth gauges is determined with respect to the height of the cutter above the link and is predetermined relative to the desired amount of cut to be taken.

In FIG. 4, the chain saw 11 is shown with a saw chain 10 in driving engagement with the chain saw sprocket 38 and being guided and carried on the bar 39. The sprocket 38 is comprised of a sprocket wheel 41, spaced between and in abutment with two discs 42 and 43. The sprocket teeth 44 extend radially outwardly between the discs and have the same diameter as the latter.

The tangs 26 are adapted in size to fit between the sprocket teeth 44 and to be held against lateral movement by the discs 42 and 43 which extend outwardly of the spaces between the sprocket teeth. The chain rides on the bar 39 in its peripheral groove 40 with the bottom of tangs 26 riding on the bottom surface 40a of the bar.

The chain is manufactured by means of a first stamping operation in which the steel or other material is cut into a flat piece with the plates 23 and 24 at 180° from each other and the wall 19 which forms the loop 18, extending flatly between the plates 23 and 24. In a single step operation, the links are joined together and formed. That is, a plate of one link is inserted between an opening 25 of a preceding link and the loop 18 is formed as the plates 23 and 24 are then forced together. The vertical height of the wall 19 must be less than the vertical height of the opening 25 for each link and similarly, the vertical height of the main body portion of each link, from the top thereof to the bottom of the tang, must be less than the longitudinal distance between the opposite ends of the openings 25. The steel or other material used may be of the same thickness throughout, as for example, approximately 0.027 of an inch.

The length of each link may be approximately 0.665 of an inch and the external diameter of the loop 18 for such a structure is approximately 0.185 of an inch. The vertical height of the loop is approximately 0.096 of an inch and the vertical height of the opening 25 is approximately 0.107 of an inch. The forward and rearward ends of the tangs are cut at an angle of approximately 40° from the vertical, and the distance between the horizontal center of the opening 25 and the bottom of the tang is approximately 0.175 of an inch, the length of the opening 25 being approximately 0.308 of an inch. The overall height of the main body portion of each link is approximately 0.302 of an inch. The longitudinal length of the cutters is approximately 0.180 of an inch and the space between the cutters and the depth gauges is approximately 0.153 of an inch, the longitudinal length of the depth gauges being approximately 0.100 of an inch. The vertical height of the cutters above the longitudinal and horizontal center of the openings 25 is approximately 0.280 of an inch and depth gauges are set to be approximately 0.025 of an inch vertically lower than the cutters. The main body portion of each link from the forward end adjacent the loop to the rearward end is approximately 0.451 of an inch.

Figure 5:
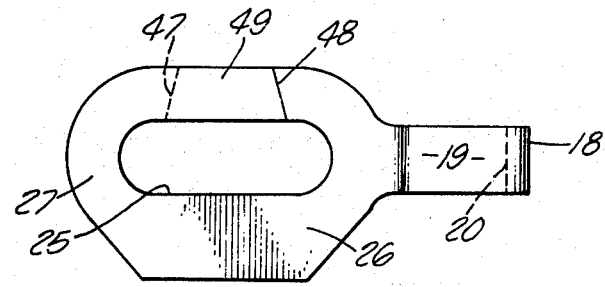
FIG. 5 is an elevational view of a replaceable or repair link for use in the saw chain.
Figure 6:
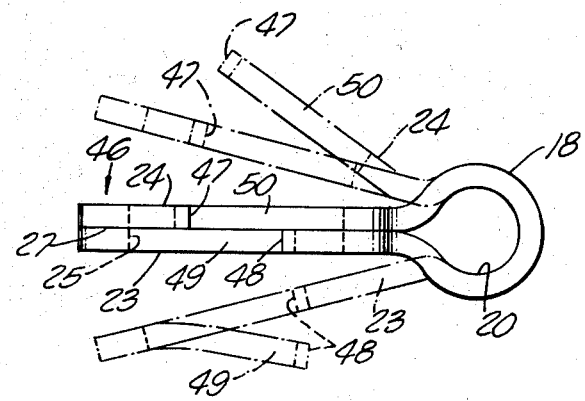
FIG. 6 is a plan view of the link shown in FIG. 5 illustrating the means by which it may be connected to a preceding and succeeding link.

In FIGS. 5 and 6, there is shown a repair or connecting link, generally designated as 46. It has the same general configuration as the other links and may be used to replace a broken link. It also can be used to connect the chain together to make it continuous. The link comes to the user as shown in broken lines in FIG. 6, with the loop 18 substantially formed but with the plates 23 and 24 spaced apart. Each of the upper walls of the plates have a cut, as 47 and 48, extending from the top of the plate to the opening 25 in each plate, the cut being at approximately 15° from the vertical.

In the plate 23 extending toward the rear thereof is a bendable portion 49, as shown in the bent or open position in broken lines in FIG. 6 and in the flat and closed position in FIG. 5. Similarly, in the plate 24 extending from the cut toward the forward end of the link is a bendable portion 50. To connect two links 12 together by means of a link 46, one of the plates, as 24, is inserted through the opening 25 in the forward one of the two links, and the plates 23 and 24 are then compressed together with the bendable portions 49 and 50 in the open positions as shown in broken lines in FIG. 6. The loop of the link to be connected to the rear is slipped onto the bendable portion 49 at the opening provided between the cut 48 and the flat part of the link and then moved rearwardly to be slipped between the cut of the bendable portion 50 and the flat portion of the link. After the loop is in place, the bendable portions are compressed together and the link has the form shown in full lines in FIGS. 5 and 6.

Figure 7:
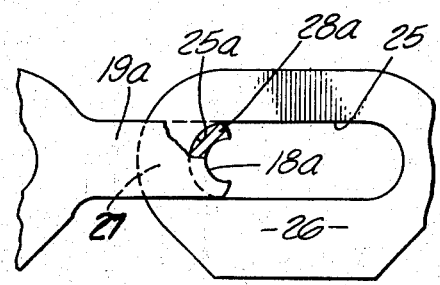
FIG. 7 is a side elevational view of an alternate configuration of a means for connecting the links.

In FIG. 7, there is shown an alternate form of connecting loop, as 18a. Here, the loop has its forward wall portion 28a curved to be complementary with the curved end 25a of the opening 25. Thus, the internal surface of the portion 28a is convex and the external surface is concave. The wall portion 28a extends laterally on both sides to gradually form a vertically straight up-and-down, generally circular wall 19a as found in the wall 19.

A PREFERRED PROTECTIVE MOUNTING ARRANGEMENT

Figure 8:
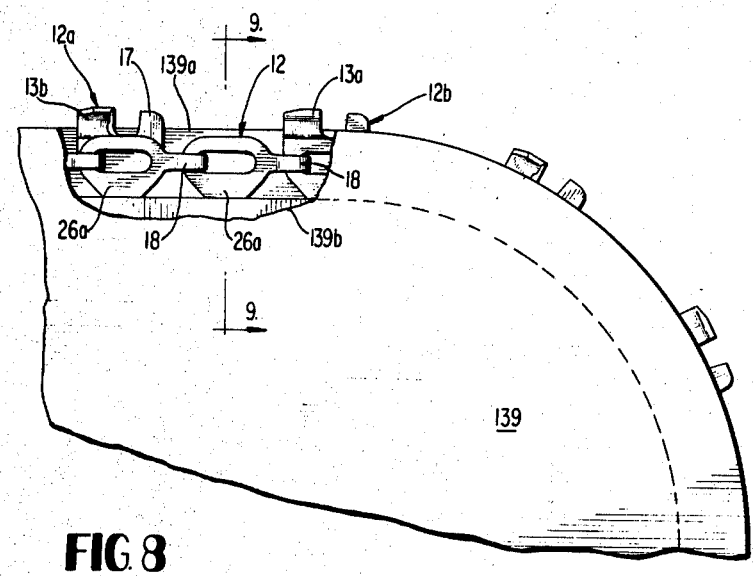
FIG. 8 illustrates a preferred arrangement for supporting a link assembly on the guide bar of a chain saw.
Figure 9:
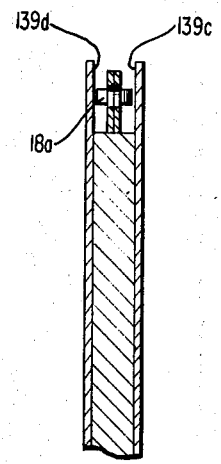
FIG. 9 provides a transverse sectional view of the FIG. 8 mounting arrangement, as viewed along section line 9-9 of FIG. 8, and illustrating the manner in which the link tang portions serve to maintain the linking loop portions free of abrading contact with the rim of the guide bar.

As shown in FIGS. 8 and 9, each of the cutter links 12a, 12b and connecting links 12 are supported in a chain saw guide bar 39 so as to positively prevent excessive abrasion or wear in the area of the connecting loop portions 18.

As shown in FIGS. 8 and 9, a guide groove 139a of a guide bar 139 includes a base 139b. This base 139b is disposed in supporting engagement with the undersurfaces 26a of the tangs 26. With the links thus supported, the side walls 139c and 139d of the guide groove 139a do not serve as the prime support for the links, i.e., they do not supportingly engage the undersurfaces 18a of the loops 18. In this fashion, with the side wall peripheral edges 139e and 139f spaced from the loop edges 18a, excessive abrasion or wear on the connecting loops 18 is avoided so as to prolong operating life of the chain.

It should also be noted that the side walls 139c and 139d may be spaced slightly wider than the width of the loops 18 and project beyond the sides of the loops 18. Thus, as shown in FIGS. 8 and 9, improved lateral shielding of the link assembly is provided without interfering with the cutting action of the depth gauges 17 and cutting blades 13a and 13b.

REVIEW OF CUTTING LINK BLANK STRUCTURE AND OVERALL CHARACTERISTICS OF LINK ASSEMBLY

Figure 10:
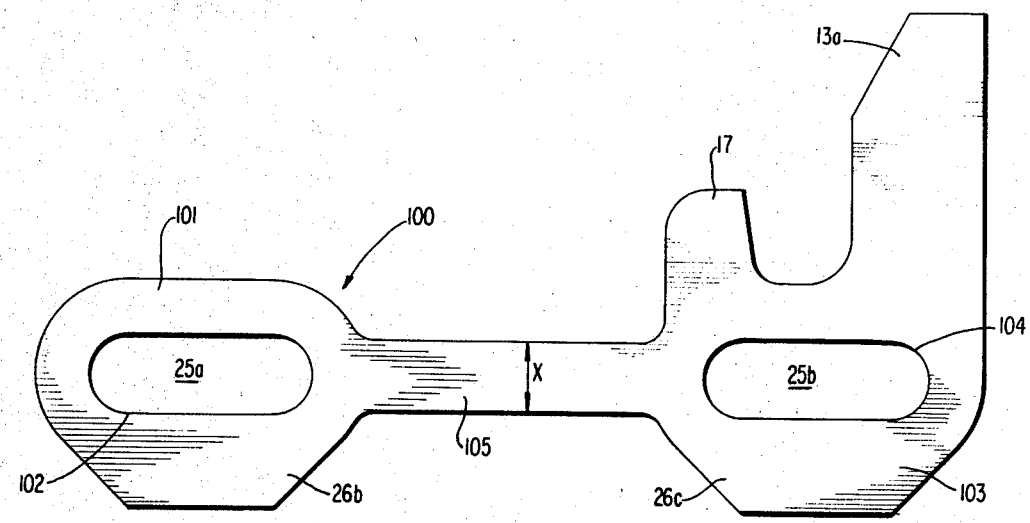
FIG. 10 provides a plan view of a cutter link prior to the forming of the link into the assembled format illustrated in FIGS. 1 through 3.

FIG. 10 illustrates a blank 100 used to fabricate the cutter link 12b shown in FIGS. 1 through 3.

As shown in FIG. 10, this blank includes a first planar portion 101. This first planar portion includes generally elipsoidal wall means 102 defining the elongate aperture 25a extending longitudinally of the blank 100. A guide tang 26b projects laterally from one side of the aperture 25a.

Blank 100 also includes a second planar portion 103 longitudinally displaced from the first planar portion 101. The second planar portion 103 includes generally elipsoid wall means 104 defining an elongated aperture 25b longitudinally aligned with but displaced from the elongate aperture 25a of the first planar portion 101. A guide tang 26c projects laterally from one side of the aperture 25b and is generally longitudinally aligned with the guide tang 26b of the first planar portion.

A cutting blade 13a (not yet formed into the sharpened, hooded configuration of FIG. 1) projects from an opposite side of the aperture 25b generally away from the guide tang 26c. A depth gauge 17 is longitudinally displaced from the cutting blade 13a and projects from the opposite side of the aperture 25b, generally away from the guide tang 26c.

A connecting web 105 extends between the first and second planar portions 101 and 103 and has a width X slightly less than that of each of the first and second apertures 25a and 25b. Web 105 ultimately is formed into loop 18. Loop 18 includes an end portion 18a curved as a cylindrical segment about an axis Y. Axis Y extends perpendicular to the median plane extending between and parallel to the loop body portions 101 and 103. Overall, loop 18 curves as a substantially cylindrical segment about axis Z. Axis Z is aligned with this median plane and perpendicular to the travel direction D.

This blank 100 is formed into the configuration shown in FIGS. 1 through 3.

As will be appreciated, a blank substantially identical to the blank 100 but lacking the depth gauge and cutter blade portions of the blank 100 is used to form the connecting link 12 shown in FIGS. 1 through 3. A blank identical to blank 100 but "reverse folded" is used to form cutter link 12b.

With the cutter and spacer link blanks thus formed and assembled, as previously described, a unique assembly of cutter links is produced.

This assembly, shown in FIGS. 1 and 2, includes a first cutter link 12a wherein the first planar portion 101 extends parallel to a cutting travel direction D of the assembly. The second planar portion 103 extends parallel to said cutting travel direction and is disposed laterally adjacent said first portion 101. The third portion 105 is displaced longitudinally of, and interconnects, each of first and second portions 101 and 103 and is formed to define the linking aperture 20 having an aperture axis Z generally parallel to a plane passing between said first and second portions 101 and 103. This aperture axis is transverse to the cutting travel direction D. Wall means 102 and 103 define the mounting aperture 25 in link 12a. This aperture 25 has an aperture axis extending perpendicular to the plane passing between and parallel to the first and second portions 101 and 103. The cutting blade 13a is formed integrally with the planar portion 103. Each of the first, second and third portions 101, 103 and 105, and the cutting blade 13a is fabricated as a unitary portion of a single piece of sheet metal. This metal, of course, must be capable of providing reasonable, commercial operating life for the blade surfaces 32 and 33. However, this metal need not be amenable to resharpening, if the saw chain is to be used as a "throwaway" item.

The link assembly includes a second, spacer link 12.

Spacer link 12 includes first and second planar portions and a third, loop portion substantially the same as those described in connection with link 12a. However, spacer link 12 lacks the depth gauge 17 and cutter blade 13a of cutter link 12a.

Each of the first and second planar portions of spacer link 12, and their associated tang portions, are operable to pass through the mounting aperture 25 of the cutter link 12a. As will be recognized, aperture 25 is formed by the laterally contiguous disposition of aperture 25a and 25b. The connecting loop portion 18 of said link 12 is pivotably engaged with an end 25c of the mounting aperture 25 of cutter link 12a for pivotable movement generally about said linking aperture axis. This axis Z extends perpendicular to travel direction D but is parallel to the median longitudinal plane of links 12 and 12a.

The laterally contiguous guide tangs 26b and 26c carried by the link 12a and the corresponding guide tangs of link 12 are operable to guidingly engage the chain saw guide bar 39 so as to constrain the link assembly for longitudinally aligned travel through the defined cutting travel path 40.

As will also be noted, the loop portion 18 of link 12 is curved about a prime pivot axis Y so as to facilitate pivoting of the links as they travel around the curved ends of a guide bar.

As will be recognized, in this link assembly, cutting forces acting on the cutting surface 33 tend to move the link body portion 103 laterally away from the other body portion 101. This separation tendency is effectively and substantially offset by the restraining action of the loop portion 18 of link 12 which intersects the aperture 25 of the cutting link 12a. This loop portion 18 of link 12, in engaging the outer sides of the body portions 101 and 103 at the aperture corners 25c and 25d, tends to resist cutter action induced separation forces. This restraining effect is optimized by having the loop 18 in general alignment with the axis passing through the cutter hood 13a and extending perpendicular to the cutting travel direction D and in general alignment with the median plane passing between the link body portions 101 and 103.

As will be noted, in this assembly the links 12a, 12b and 12 are free to pivot with reference to each other about the pivot axes Z of the connecting loops 18. This enables the overall link assembly to be collapsed and stored in a small area, such as a small container or even the pocket of the user of a chain saw. This also enables certain stresses to be relieved in the chain in a direction transversely of the cutting direction in the chain assembly.

SUMMARY OF ADVANTAGES AND SCOPE OF INVENTION

A prime advantage of the overall invention resides in the recognition that interlooped, sheet metal links may be employed as the link elements of a chain saw. This at first seemingly impossible use of interlooped sheet metal links enables the production of a highly inexpensive chain saw link assembly. Indeed, cutter link assemblies may be produced which are so inexpensive that a user may prefer to throw a dulled cutter link assembly away rather than attempt to sharpen the cutter blade portions of the assembly.

An especially unobvious facet of the invention resides in the mounting of cutter surfaces so that they are supported primarily by one side of a folded sheet metal link. Inherently this support arrangement would produce separation forces tending to spread or distort the folded link halves. This force effect would be expected to lead those skilled in the art away from the discovery of this invention.

In the preferred and illustrated embodiment, this separation tendency is simply and effectively avoided by using the looping links themselves as devices to offset the separation forces acting on the folded link body portions.

The unique multidirectional flexibility of the assembly, i.e., the ability of the links to pivot in two directions relative to each other, afford several unique advantages. The ability of the links to pivot laterally with respect to the travel direction enables cutter link assembly stresses to be relieved and also enables the link assembly to be stored in a small area. The ability of the links to pivot about an axis extending perpendicular to the median plane of the links enables the assembly to traverse the usual guide path defined by the peripheral rim of a guide bar. However, this pivoting is made possible through the present invention without resorting to the rivets or connecting pins of prior known chain saws. In this fashion, the necessary pivot action is achieved with a considerably improved degree of structural simplicity.

Where the guide tangs serve as the prime support for the links, cutter force induced wear is effectively removed from the interlinking loop portions of the assembly so as to advantageously prolong the operating life of the assembly.

As will be apparent, the multidirectional pivotability of the link assembly would enable the assembly to be employed in a variety of oriented fashions. For example, in some instances, it may be appropriate for the assembly to travel with its planar portions extending perpendicular to the median plane of a guide bar and with the guide tangs depth gauges and cutting blades of the links bent transversely of the apertured body portions of the links.

These and other modifications, deletions or substitutions may be recognized by those skilled in the art and familiar with the disclosure of this invention and would be encompassed by the appended claims.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific forms shown or uses mentioned except as defined in the accompanying claims, wherein various portions have been separated for clarity of reading and not for emphasis.

I claim:

1. A rivetless saw chain comprising:
   links joined end-to-end and in longitudinal alignment;
   each of said links having a main body portion;
   said main body portions being unitary and formed from a folded structure having two abutting flat plate members;
   each of said main body portions having a horizontal transverse opening therethrough and having a part of said opening adjacent one end of its respective link;
   a loop extending longitudinally from each of said main body portions and being at the other end of its respective link, said loop being formed of extensions of said plate members, the plate members and loop being integral, each loop having its opening vertically directed, and being designed to linkingly engage with a horizontal transverse opening in an adjacent link main body portion;

a tang extending vertically inwardly from each respective plate member for engagement with a driving sprocket;

alternate left and right hand cutters extending in an allochrial relationship outwardly from said body portions of selected links;

the cutter on each selected link being an integral extension of only one of said two abutting flat plate members;

the cutter on each selected link having a shank integrally extending laterally and vertically outward from said plate member on the same side of said chain as the cutter;

a vertical portion extending from said shank portion having a side cutting edge;

a returning transverse portion extending from said vertical portion and over said chain, spaced vertically therefrom;

a cutting edge on said transverse portion extending from said side cutting edge so as to form a continuous cutting edge; and a depth gauge extending vertically outwardly, forwardly of the cutter, on each respective selected link.

2. The invention according to claim 1 in which: said selected links having either a left or right hand cutter thereupon being spaced by at least one link not having a cutter extending from either of said flat plate members.

3. A sheet metal blank to be used in forming a cutter link of a chain saw assembly, said blank comprising:

a first, flat, planar portion consisting of wall means defining an elongate aperture extending longitudinally of said blank, and a guide tang projecting laterally from one side of said wall means;

a second, flat, planar portion longitudinally displaced from said first planar portion and including:

wall means defining an elongate aperture longitudinally aligned with but displaced from the elongate aperture of said planar portion, a guide tang projecting laterally from one side of said wall means and generally longitudinally aligned with the guide tang of said first planar portion, a cutting blade projecting from an opposite side of said wall means generally away from said guide tang, and a depth gauge longitudinally displaced from said cutting blade and projecting from said opposite side of said wall means generally away from said guide tang;

a connecting web extending between said first and second planar portion and having a width less than that of each of said first and second apertures, whereby said sheet metal blank may be folded such that the first and second flat planar portions become juxtaposed and said first and second apertures come into register and said connecting web connecting web forming a loop for pivotal coupling with said first and second apertures of an adjacent cutter link.

4. The invention according to claim 1, including:

a connecting link having the same general configuration as the other of said links;

said connecting link having a first closable break in one of said plate members and extending generally vertically in a portion thereof between said opening and the top vertical surface thereof adjacent a part of said opening remote from said one end of said link;

said connecting link having a second closable break in the other of said plate members and extending generally vertically in a portion thereof between said opening and the top vertical surface thereof adjacent a part of said opening adjacent to said one end of said link; and plate member portions defining said top surface between said breaks being bendable laterally outwardly away from the respective plate member commencing at said break whereby said connecting link can be joined or disjoined to or from the loop of the next link.

5. The invention according to claim 1, in which: each of said vertical portions and said transverse portions of said cutters having forward facing beveled surfaces inwardly of said cutting edges.

6. The invention according to claim 1, in which:

said opening through each link has adjacent said one end a concave inwardly facing curved surface and said loop end portion has a complementary convex curved surface adapted to mate with said last surface; and said loop end portion having an outer curved concave surface directly outwardly of said convex surface.

PO-1050
(5/69)

UNITED STATES PATENT OFFICE
CERTIFICATE OF CORRECTION

Patent No. 3,538,965      Dated November 11, 1970

Inventor(s) Jack W. Ehlen and Joseph B. Stretton

It is certified that error appears in the above-identified patent and that said Letters Patent are hereby corrected as shown below:

Column 2, line 36, "allochrially" should read -- allochirally --.

Column 4, line 39, after "an" omit "elongated" and substitute -- elongate --.

Column 5, line 3, after "of" (second occurrence) insert -- the --.

Column 5, line 56, after "with" omit "the" and substitute -- an --.

Column 7, line 35, after "said" insert --first --.

Column 8, line 2, after "tang;" insert -- and --.

Column 8, line 9, after "web" (first occurrence), omit "connecting web".

SIGNED AND
SEALED
MAR 9 1971

(SEAL)
Attest:

Edward M. Fletcher, Jr.
Attesting Officer

WILLIAM E. SCHUYLER, JR.
Commissioner of Patents